3,183,224
PYRIMIDINE DYESTUFFS
Jakob Benz, Muenchenstein, Hermann Burkhard, Basel, Karl Kaegi, Riehen, and Hans von Tobel, Basel, Switzerland, assignors to Sandoz Ltd., Basel, Switzerland
No Drawing. Filed Apr. 25, 1960, Ser. No. 24,257
Claims priority, application Switzerland, Apr. 27, 1959, 72,598
12 Claims. (Cl. 260—146)

This invention relates to water-soluble organic dyestuffs containing at least one dihalogenated pyrimidine ring, bearing in the 5-position a halogenovinyl or a carboxymethyl group. The process consists in condensing organic dyestuffs which contain at least one, but preferably more than one, water-solubilizing group and at least one exchangeable hydrogen atom, or organic compounds which contain at least one exchangeable hydrogen atom and at least one substituent capable of dyestuff formation with a 2.4.6-trihalogenopyrimidine bearing in the 5-position a substituent other than halogen or alkyl, whereupon the reaction products, when they contain radicals of organic compounds with substituents capable of dyestuff formation, are converted into water-soluble dyestuffs by a suitable reaction.

The new process is applicable with all classes of water-soluble dyestuffs. By "exchangeable hydrogen atoms" are understood, for example, the hydrogen atoms of the hydroxy and thiol groups, but preferably those of the amino group which may be monosubstituted by alkyl, hydroxyalkyl, alkoxyalkyl or halogenoalkyl radicals. Thus, the water-soluble organic dyestuffs of primary interest for the present purpose are those which contain at least one amino group; noteworthy examples of this type are aminomonoazo and aminopolyazo dyestuffs, aminoanthraquinone dyestuffs and aminophthalcyanime dyestuffs. The aminomonoazo and aminopolyazo dyestuffs may contain co-ordinatively bound metal atoms, e.g. chromium, cobalt, nickel or copper atoms. Alternatively, suitable aminoazo dyestuffs can be reacted with 2.4.6-trihalogenopyrmidines conforming to the above definition which contain metallizable groupings. The dyestuffs so formed can be metallized in substance after condensation or they can be applied to their fiber in the metal-free form and the dyeings aftertreated with metal-yielding agents.

Further, dyestuffs possessing at least one reactive hydroxy group and those containing a reactive hydroxy group and a reactive, if desired monosubstituted, amino group can be reacted with 2.4.6-trihalogenopyrimidines of the type defined. In this reaction the amino and the hydroxy groups can either be combined directly to aromatic nuclei of the dyestuff molecule, or indirectly through an aliphatic chain and, depending on circumstances, a bridge member.

The following are examples of aliphatic chains:

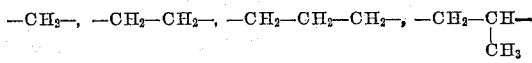

and

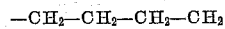

Examples of suitable bridge members are:

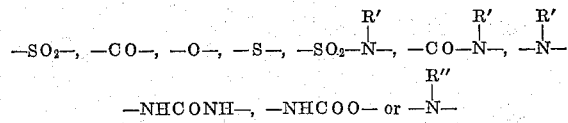

wherein R' represents hydrogen, low molecular alkyl or hydroxyalkyl, cycloalkyl, aryl and aralkyl and R'' stands for an acyl radical.

In accordance with the definition it is possible to arrive at water-soluble dyestuffs containing at least one dihalogenated pyrimidine ring by another route starting from organic compounds which possess at least one exchangeable hydrogen atom and at least one substituent capable of dyestuff formation. The azo coupling has a significant bearing on the reaction giving the final dyestuffs. It can be effected by reacting a compound containing at least one exchangeable hydrogen atom and one diazotizable amino group with a 2.4.6-trihalogenopyrimidine conforming to the above definition, and then diazotizing the intermediate product and coupling the diazo compound with a coupling component to give a water-soluble dyestuff, or by reacting a compound containing at least one exchangeable hydrogen atom and a substituent convertible into a diazotizable amino group with a 2.4.6-trihalogenopyrimidine of the type defined, and converting the said substituent in the intermediate product into the amino group, diazotizing the amino compound, and coupling the diazo compound with a coupling component to arrive at a water-soluble dyestuff. Alternatively, a 2.4.6-trihalogenopyrimidine conforming to the definition can be reacted with a diamino compound containing one amino group of high reactivity and a second amino group of low reactivity, whereupon the condensation product, which contains a free amino group and a dihalogenated pyrimidine ring, is employed as diazo component.

Further, it is possible to condense compounds having at least one exchangeable hydrogen atom and at least one carbon atom capable of coupling, e.g. aminohydroxy compounds, with a 2.4.6-trihalogenopyrimidine of the above definition to obtain an intermediate product which is used as coupling component. Naturally, the diazo compound of a diazo component containing a dihalogenopyrimidine ring conforming to the invention can be coupled with a coupling component which likewise contains a dihalogenopyrimidine ring conforming to the invention.

Examples of organic compounds which can be used for producing the pyrimidine dyestuffs are: 1.3- and 1.4-diaminobenzenesulfonic acids and -carboxylic acids, 4.4'-diamino-1.1'-diphenyl-3-sulfonic acid, 1-(3'- or 4'-amino)-phenyl-3-methyl-5-pyrazolone, amino-hydroxynaphthalenes or preferably, their sulfonic acids, e.g. 2-amino-5-hydroxynaphthalene-7-sulfonic acid, 2-amino-8-hydroxynaphthalene-6-sulfonic acid, 1-amino-8-hydroxynaphthalene-4.6-disulfonic acid, 1-amino-8-hydroxynaphthalene-3.6-disulfonic acid.

2.4.6-trihalogenopyrimidines conforming to the present definition are the 2.4.6-tribromopyrimidines and, preferably, 2.4.6-trichloropyrimidines which may contain in the 5-position a chlorovinyl or a carboxymethyl group.

The reaction of the compounds or water-soluble dyestuffs used as starting products with the 2.4.6-trihalogenopyrimidines of the above definition is carried out preferably in aqueous medium. The halide can be employed as such in concentrated form or in solution in an organic solvent. Solvents specially suitable for halogenopyrimidines are acetone, benzene, chlorobenzene and toluene.

The reaction temperature is varied to suit the reactivity of the individual starting products. If temperatures higher than about 40° C. are necessary it is advisable to work in vessels equipped with reflux condensers in view of the volatility in steam of the halogenopyrimidines.

The reaction is conducted in weakly alkaline, neutral to weakly acid medium preferably in the pH-range of 9 to 3. To neutralize the halogen halide formed, an acid-binding agent, e.g. sodium acetate, is added to the solution at the beginning of the reaction, or alternatively small amounts of sodium or potassium carbonate are added in solid powder form or as an aqueous solution during the course of the reaction. Aqueous solutions of sodium or potassium hydroxide are also suitable as neutralizing agents. The addition of small amounts of a wetting or emulsifying agent to the reaction mixture can accelerate the rate of reaction.

In both modes of operation of the process the reaction is conducted in such a manner that only one halogen atom of the 2.4.6-trihalogenopyrimidine reacts with an exchangeable hydrogen atom.

On completion of the condensation or coupling reaction, the solution or suspension may be neutralized if desired, and the final pyrimidine dyestuff is then salted out with sodium or potassium chloride or precipitated with acid, and filtered with suction, washed and dried.

The water-soluble dyestuffs of the invention which contain at least one dihalogenated pyrimidine ring are suitable for the dyeing, padding and printing of fibers of animal origin, e.g. wool and silk, synthetic polyamide fibers, e.g. nylon, leather, cellulosic fibers, e.g. cotton, linen and hemp, fibers of regenerated cellulose, e.g. viscose filament and staple fibers and cuprammonium rayon, and mixtures of these fibers. The optimum conditions of application vary with the type of fiber and the dyestuffs employed. Animal fibers and synthetic polyamide fibers are preferably dyed or, in printing, fixed in acid, neutral or weakly alkaline medium, e.g. in presence of acetic acid, formic acid, sulfuric acid, ammonium sulfate, sodium metaphosphate etc. Dyeing can also be carried out in an acetic acid to neutral bath in presence of levelling agents, e.g. polyoxyethylated fatty amines or mixtures of these and alkylpolyglycol ethers; on completion of dyeing the bath is adjusted to the neutral or weakly alkaline region by the addition of small amounts of an agent of alkaline reaction, e.g. ammonia, sodium bicarbonate, sodium hydroxide etc., or compounds which react alkaline on heating, e.g. hexamethylene tetramine or urea. The goods are subsequently rinsed well and, if necessary, soured with a little acetic acid.

In the dyeing and printing of animal and synthetic polyamide fibers the linkage formed between the dyestuff molecule and the fiber is often less pronounced, owing to the fact that some of the dyestuffs by virtue of their acidic character possess affinity for the fiber.

The dyeing, padding and printing or fixation of the dyestuff on cellulosic fibers is carried out to best advantage in alkaline medium, e.g. in presence of sodium bicarbonate, sodium carbonate, sodium hydroxide solution, potassium hydroxide solution, sodium metasilicate, sodium borate, trisodium phosphate, ammonia etc. To preclude reduction effects in dyeing, padding or printing it is often of advantage to employ a mild oxidizing agent, e.g. sodium 1-nitrobenzene-3-sulfonate. Fixation of the dyestuffs on cellulosic fibers is generally accomplished with heating. A certain number of the dyestuffs in which the dyestuff molecule is linked with the dihalogenopyrimidine ring through an oxygen atom can be dyed and/or fixed at low temperatures, e.g. 20–40° C., by using sufficiently strong alkalis such as sodium or potassium hydroxide or trisodium phosphate.

The dyeings and prints on cellulosic fibers are especially notable for their excellent wet fastness properties (fastness to water, washing, milling, perspiration and crocking, and their excellent fastness to dry cleaning which are a consequence of the stable chemical linkage formed between the dyestuff molecule and the cellulose molecule. Often the entire amount of dyestuff applied does not take part in the chemical reaction with the fiber. In such cases the portion of unreacted dyestuff is removed from the fiber by suitable treatments, e.g. washing and/or soaping, if necessary at high temperatures; for this purpose synthetic detergents can be used, e.g. alkylarylsulfonates, sodium lauryl sulfate, sodium lauryl polyglycol ether sulfate and mono- and dialkylphenolpolygylcol ethers. The dyestuffs reserve cellulose triacetate, polyacrylonitrile and polyethylene terephthalate fibers.

In the following examples the parts and percentages are by weight and the temperatures in degrees centigrade.

*Example 1*

57.6 parts of copper phthalocyanine are added to 270 parts of chlorosulfonic acid and the solution heated for 3 hours at 140–145°. On cooling to room temperature the reaction mass is poured onto 1500 parts of ice and the suspension formed is filtered off and washed with ice-cold 1% hydrochloric acid.

The filter cake is mixed with 300 parts of ice and 500 parts of water and the suspension adjusted to pH 7 with sodium hydroxide solution. 15 parts of 1-amino-3-acetylaminobenzene and 100 parts of sodium bicarbonate are added and the mixture stirred for 24 hours. It is subsequently heated for 1 hour at 60°, after which 200 parts of 30% hydrochloric acid are added and the suspension formed stirred for 3 hours at 85–90°. The intermediate product is filtered off and thoroughly washed with 2% hydrochloric acid.

The filter cake is mixed with 800 parts of water and neutralized with sodium hydroxide solution. 25 parts of 2.4.6.-trichloro-5-(1'-chlorovinyl)-pyrimidine are added, followed at 30–40° by sufficient sodium hydroxide solution to maintain a constant pH value of 5.5–7.0. As soon as no further sodium hydroxide solution is consumed, the dyestuff is precipitated by the addition of common salt, filtered off and dried in vacuo at 40–50°. On grinding it is obtained as a dark blue powder which dissolves in water with a turquoise-blue coloration.

A mercerized cotton fabric is padded with a solution at 40° containing 20 g./l. of the dyestuff of this example, 40 g./l. of calcined sodium carbonate and 5 g./l. of sodium 1-nitrobenzene-3-sulfonate, and squeezed to give an expression or pick-up of 80% to 100%. The padding is fixed by treatment in a conditioning chamber for 4 to 6 hours at 90–95° and at constant moisture content. The goods are then well rinsed in cold and hot water, soaped at the boil for 45 minutes with 5 g./l. soap, rinsed again and dried. A brilliant turquoise dyeing of good light and wet fastness is obtained.

Cotton sateen is printed with a paste of the following composition:

30 parts of the dyestuff of the above example,
100 parts of urea,
490 parts of water,
350 parts of a 4% sodium alginate thickening,
30 parts of sodium carbonate 1000 parts total The print is dried, steamed for 10–15 minutes at 102–104°, and rinsed well in cold and warm water. If necessary it is then soaped at the boil and given a further rinse before drying. A brilliant turquoise-blue print of good light and wet fastness is obtained.

2.4.6-trichloro-5-(1'-chlorovinyl)-pyrimidine is obtained by reacting 5 - acetylbarbituric acid with phosphorous oxychloride in presence of diethylaniline. The product is purified by distillation in vacuo; it boils at 131–134° at 16 mm. mercury.

By replacing the 2.4.6-trichloro-5-(1'-chlorovinyl)-pyrimidine used in this example by the equivalent amount of 2.4.6-tribromo-5-(1' - bromovinyl) - pyrimidine, a similar dyestuff is obtained.

*Example 2*

21 parts of 2-(4' - amino-2' - methyl) - phenylazonaphthalene-4.8-disulfonic acid are dissolved neutral in 250 parts of water with the addition of 30% sodium hydroxide solution. The solution is heated to 75–85° in a mixing vessel equipped with a reflux condenser, then 13 parts of 2.4.6-trichloro-5-(1' - chlorovinyl) - pyrimidine are added and the mixture maintained at 75–85° for a few hours with vigorous stirring. The hydrogen chloride formed during the reaction is continuously neutralized by the addition of dilute sodium carbonate solution so that the pH remains constant at 5–6. When the reaction has run its course, which can be easily detected by chromatography, the pyrimidine dyestuff is precipitated by the slow addition of sodium chloride. It is filtered off and the press cake washed with dilute sodium chloride solution, and dried in vacuo at 80°. The resulting dyestuff is a yellow-brown powder which dissolves in water to give yellow solutions.

By replacing the 2.4.6-trichloro-5-(1'-chlorovinyl)-pyrimidine by the corresponding amount of 2.4.6-tribromo-5-(1'-bromovinyl)-pyrimidine, a similar dyestuff is obtained.

A fabric of mercerized cotton is padded with a 3% neutral solution of the dyestuff of this example at a temperature of 50° and an expression (pick-up) of about 85%. It is then dried and the pad-dyeing fixed by treatment for about 45 minutes with good agitation in a developing bath at 70–80° containing 250 parts of anhydrous sodium sulfate and 15 parts of trisodium phosphate per 1000 parts of the solution. The liquor ratio of this bath may be 1:10 to 1:50. After fixation, the material is well rinsed with cold water, soaped twice at the boil, rinsed again and dried. The reddish yellow dyeing obtained possesses excellent fastness to light and wet treatments.

*Example 3*

23.5 parts of sodium 6-(phenylazo)-2-amino-5-hydroxynaphthalene-7.2'-disulfonate are dissolved in 750 parts of water at pH 4.7 and 50°. In the course of 45 minutes 25 parts of 2.4.6-trichloro-pyrimidyl-5-acetic acid are added and the mixture boiled for 5 hours with reflux, the pH value being maintained constant by the addition of sodium carbonate solution. The progress of the reaction can be followed by chromatography on a talc column. On completion of the reaction the dyestuff is precipitated with 200 parts of salt and filtered off. It is purified by redissolution in 560 parts of water and reprecipitation and dried at 60° to give an orange-red powder which has fairly good solubility in water, the solutions being of the same color.

The 2.4.6-trichloropyrimidyl-5-acetic acid used in this example is produced as follows: Urea is condensed with α,α', β-ethanetricarboxylic acid triethyl ester in alcohol containing sodium ethylate, giving barbituryl-5-acetic acid which is suspended in phosphorous oxychloride with the addition of dimethylaniline and heated at 95° for 16 hours. The suspension is then run onto ice, upon which the acid is obtained in solid form; it is filtered off and recrystallized from water with the addition of dimethylsulfoxide as small colorless needles of melting point 193–195°.

If the 25 parts of 2.4.6-trichloropyrimidyl-5-acetic acid are replaced by 38 parts of 2.4.6-tribromopyrimidyl-5-acetic acid, a similar dyestuff is obtained.

A dyebath is prepared at 50° with 2 parts of the dyestuff dissolved in 5000 parts of water with 3 parts of acetic acid. 100 parts of wool are entered and the temperature increased to the boil in 30 minutes. Dyeing is continued at the boil for 1 hour, then the wool is removed and dried with or without aftertreatment with ammonia. A level dyeing with good light and washing fastness is obtained.

*Example 4*

10.9 parts of 1-hydroxy-3-aminobenzene are dissolved in 1000 parts of water with the addition of 8.8 parts of sodium hydroxide. After the addition of 24.5 parts of 2.4.6-trichloropyrimidyl-5-acetic acid the solution is stirred for 3–4 hours at room temperature, whereupon the reaction product which has precipitated as a pulpy crystalline mass is filtered off.

An amount of the moist paste equivalent to 31.4 parts of dry x-(3'-amino)-phenoxy-dichloropyrimidyl-5-acetic acid is mixed with 100 parts of water and 100 parts of 10% hydrochloric acid and diazotized at 0–5° with 25 parts of 4 n sodium nitrite solution.

For coupling, 28.6 parts of 1-acetylamino-8-hydroxynaphthalene-3.6-disulfonic acid are dissolved in 250 parts of water and the solution neutralized with sodium hydroxide, cooled to 0–5° and adjusted to pH 4–4.5 with glacial acetic acid. Then the diazo solution is added, the pH re-adjusted to 4–4.5 with sodium acetate and the solution stirred at 5° overnight. The dyestuff is subsequently filtered off and dried at 60°. It is a bluish red powder which dissolves with the same coloration in water.

*Example 5*

50 parts of 1-amino-4-(4'-methylamino)-phenylamino-anthraquinone-2.2'disulfonic acid are dissolved in 800 parts of water at 60° with the addition of sodium hydroxide solution at a pH value of 6. Then 26 parts of 2.4.6-trichloro-5-(1'-chlorovinyl)-pyrimidine are added and the pH maintained between 4.5 and 6 by dropwise addition of dilute sodium hydroxide solution. On completion of condensation the excess of 2.4.6-trichloro-5-(1'-chlorovinyl)-pyrimidine is removed by blowing through steam. 32 parts of potassium chloride are added and the mass allowed to cool with stirring. The precipitated dyestuff is filtered off and dried with vacuum at 60–80°.

A dark blue powder is obtained which readily dissolves in water with a blue coloration and dyes fibers of natural and regenerated cellulose in blue shades fast to light, washing, perspiration, water, rubbing and dry cleaning. The dyestuff reserves triacetate, polyester and acrylic fibers.

When the 1-amino-4-(4'-methylamino)-phenylamino-anthraquinone-2.2'-disulfonic acid of this example is replaced by 1-amino-4-(4'-amino)-phenylaminoanthraquinone-2.2'-disulfonic acid or 1-amino-4-(4'- or 3'-amino)- or 4-(4'- or 3'-methylamino)-phenylaminoanthraquinone-2.6- or -2.7-disulfonic acid, similar dyestuffs are obtained.

*Example 6*

46.9 parts of the monoazo dyestuff produced by coupling diazotized 3-aminobenzyl alcohol with 1-(2'.5'-dichloro)-phenyl-3-methyl-5-pyrazolone-4'-sulfonic acid in alkaline medium are dissolved neutral in 1600 parts of water at 40°. About 50 parts of 30% sodium hydroxide solution are added so that the solution is strongly alkaline to phenolphthalein. It is then cooled to 10° and over the next hour a mixture of 24.2 parts of 2.4.6-trichloro-pyrimidyl-5-acetic acid in 200 parts of water and 15 parts of 30% sodium hydroxide solution are added. Stirring is continued overnight at 0–3°, during which time the new dyestuff precipitates as a gelatinous mass. It is redissolved by adding water and is then salted out with sodium chloride, isolated in the normal manner and dried with vacuum at 60°.

The new dyestuff is a yellow powder that dissolves with a greenish yellow coloration in water. On wool, synthetic polyamide fibers and cellulosic fibers it gives bright greenish yellow dyeings and prints of excellent fastness to light and wet treatments.

2 parts of the dyestuff of this example, 0.8 part of an oxethylated fatty amine and 0.5 part of an oleylpolyglycol ether are dissolved in 5000 parts of water with the addition of 2 parts of glacial acetic acid. The dyebath is heated to 40–50°, 100 parts of wool are entered, and it is then brought to the boil in 30 minutes. After boiling for 45 minutes the material is removed, rinsed and dried. A level, greenish yellow shade of very good light and wet fastness is obtained.

*Example 7*

43.8 parts of the aminoazo dyestuff produced by acid coupling of diazotized 1-amino-4-nitrobenzene with 1-amino-8-hydroxynaphthalene-3.6-disulfonic acid and reduction of the nitro group with sodium sulfide, are dissolved in 400 parts of water with 30% sodium hydroxide solution at 50°. The pH of the solution is adjusted to 5. In the course of 45 minutes 48 parts of 2.4.6-trichlorpyrimidyl-5-acetic acid are added and the mixture boiled for 5 hours with reflux with gradual simultaneous addition of sodium carbonate to maintain a constant pH value. The progress of the reaction can be followed by chromatography on a talc column. On completion of the reaction the dyestuff is precipitated with salt, filtered off and washed with a common salt solution. The dyestuff paste obtained is dissolved neutral in 500 parts of water and the solution cooled to 5°. To the solution is added the suspension of the diazo compound of 39.2 parts of 1 - amino - 3 - (5' - carboxymethyl - dichloro) - pyrimidylaminobenzene-6-sulfonic acid followed by crystallized sodium acetate so that the pH value increases to approximately 6. On the next day the mass is heated to 60° and the disazo dyestuff isolated by salting out and filtration. It is dried to give a black powder.

This dyestuff is highly suitable for dyeing wool, on which it gives level, full gray to black shades possessing high fastness to light, water, washing, milling, perspiration, crocking and dry cleaning.

The 1 - amino - 3 - (5' - carboxymethyl - dichloro)-pyrimidylaminobenzene-6-sulfonic acid used in its production is obtained as follows:

94 parts of 1.3-diaminobenzene-6-sulfonic acid are dissolved neutral in 1500 parts of water with the addition of a 30% sodium hydroxide solution. The solution is heated to about 50–60° and in 1 hour or so 200 parts of 2.4.6-trichloropyrimidyl-5-acetic acid are added while the pH value is held constant at 5–5.5 by the addition of sodium carbonate. The mixture is boiled for a few hours with reflux until the reaction is completed, the pH value being maintained constant with sodium carbonate additions. With concentrated hydrochloric acid the solution is then rendered acid to Congo red paper and about one hour later the crystallized reaction product is filtered off, washed and dried.

*Example 8*

A similar dyestuff is obtained when 1-amino-4-nitrobenzene-2-sulfonic acid is used for the acid coupling reaction in place of 1-amino-4-nitrobenzene. Equally valuable are the disazo dyestuffs which are obtained in an exactly analogous manner by coupling 2 moles of diazotized 1-amino-3-(5'-carboxymethyl-dichloro)-pyrimidylaminobenzene-6-sulfonic acid with 1 mole of 1-amino-8-hydroxynaphthalene-3.6- or -4.6-disulfonic acid.

A dyebath is prepared at 50° with 2 parts of the dyestuff dissolved in 5000 parts of water with 3 parts of acetic acid. 100 parts of wool are entered and the temperature increased to the boil in 30 minutes. Dyeing is continued at the boil for 1 hour, then the wool is removed and dried with or without aftertreatment with ammonia. A level dyeing with good light and washing fastness is obtained.

In the following table are listed the chemical names of dyestuffs free from reactive groups and corresponding to the reactive dyestuffs of the invention which contain a dihalogenopyrimidyl radical bearing in the 5-position a group —CCl=CH$_2$ or —CH$_2$—COOH and are obtainable according to the details given in Examples 1 to 8. In these names the hydroxy group or the amino group or groups to which the reactive group is attached, are underlined.

9. 1-(2'-chloro)-phenyl-3-methyl-4-(3''-amino)-phenylazo-5-pyrazolone-5.6''-disulfonic acid.
10. 1-(2'-chloro-6'-methyl)-phenyl-3-methyl-4-(3''-amino)-phenylazo-5-pyrazolone-6''-sulfonic acid.
11. 1-hydroxy-2-(3'-amino)-phenylazo-naphthalene-4.8.6'-trisulfonic acid.
12. 2-amino-7-phenylazo-8-hydroxy-naphthalene-6.2'-disulfonic acid.
13. 1-amino-4-(4'-amino)-phenylamino-anthraquinone-2.6.3'-trisulfonic acid.
14. 4-amino-4'-(4''-methoxy)-phenylazo-1.1'-stilbene-2.2'-disulfonic acid.
15. 1-amino-7-(4'-methyl)-phenylazo-8-hydroxy-naphthalene-4.6-disulfonic acid.
16. 1-hydroxy-2-(3'-amino)-phenylazo-naphthalene-3.6.6'-trisulfonic acid.
17. 1-amino-4-[4'-(4''-amino)-phenyl]-phenylamino-anthraquinone-2.6.3''-trisulfonic acid.
18. Copperphthalocyanine-trisulfonic acid amide-sulfonic acid-(4'-amino)-phenylamide.
19. 1-amino-7-(2'-methyl)-phenylazo-8-hydroxynaphthalene-3.6.5'-trisulfonic acid.
20. 1-amino-7-(2'-methyl)-phenylazo-8-hydroxy-naphthalene-3.6.4'-trisulfonic acid.
21. 1-amino-7-(4'-methoxy)-phenylazo-8-hydroxy-naphthalene-3.6.6'-trisulfonic acid.
22. 1-amino-7-(3'-acetylamino)-phenylazo-8-hydroxy-naphthalene-3.6.6'-trisulfonic acid.
23. 1-amino-7-(3'-amino)-phenylazo-8-hydroxy-naphthalene-3.6.6'-trisulfonic acid.
24. 1-amino-7-(3'-amino-4'-methyl)-phenylazo-8-hydroxy-naphthalene-3.6.6'-trisulfonic acid.
25. 1-amino-7-(3'-trifluoromethyl)-phenylazo-8-hydroxynaphthalene-3.6.6'-trisulfonic acid.
26. 1-amino-7-[4'-(6''-methyl)-benzothiazolyl-(2'')]-phenylazo-8-hydroxy-naphthalene-3.6.x''-trisulfonic acid.
27. 2-(4'-amino)-phenylazo-naphthalene-4.8-disulfonic acid.
28. 2-(4'-amino-2'-acetylamino)-phenylazo-naphthalene-4.8-disulfonic acid.
29. 2-(4'-amino-2''-sulfoacetylamino)-phenylazo-naphthalene-4.8-disulfonic acid.
30. 2-(4'-amino-3'-carboxy)-phenylazo-naphthalene-4.8-disulfonic acid.
31. 2(4'-amino-2'-methyl)-phenylazo-naphthalene-5.7-disulfonic acid.
32. 1-phenyl-3-methyl-4-(3''-amino)-phenylazo-5-pyrazolone-2'.6''-disulfonic acid.
33. 1-[4''-acetylamino)-stilbenyl-(4')]-3-methyl-4-(3'''-amino)-phenylazo-5-pyrazolone-2'.2''.6'''-trisulfonic acid.
34. 1-(2'.5'-dichloro)-phenyl-3-methyl-4-[4'''-amino)-phenyl]-phenylazo-5-pyrazolone-4'.2''-disulfonic acid.
35. 1-[3'-keto-2'-(3'''-amino)-phenylazo]-butylraminobenzene-4.6'-disulfonic acid.
36. 1-naphthyl-(2')-3-methyl-4-(4''-amino)-phenylazo-5-pyrazolone-5'.7'.2''-trisulfonic acid.
37. 1-(2'.5'-dichloro)-phenyl-3-methyl-4-(4''-amino)-phenylazo-5-pyrazolone-4'.2''-disulfonic acid.
38. 1-barbiturylazo-3-amino-benzene-6-sulfonic acid.
39. 1-(2'.5'-dichloro)-phenyl-3-methyl-4-[4''-(4'''-amino-2'''-methyl)-phenyl-3''-methyl]-phenylazo-5-pyrazolone-4'.6''-disulfonic acid.
40. 1-naphthyl-(2')-3-methyl-4-(3''-amino)-phenylazo-5-pyrazolone-4'.8'.6''-trisulfonic acid.
41. 1-phenyl-3-methyl-4-(4''-amino)-phenylazo-5-pyrazolone-2'.5'.2''-trisulfonic acid.
42. 1-(3'-amino)-phenylazo-2-hydroxy-naphthalene-6.6'-disulfonic acid.
43. 1-(3'-amino)-phenylazo-2-hydroxy-naphthalene-8.6'-disulfonic acid.
44. 1-(3'-amino)-phenylazo-2-hydroxy-naphthalene-6.8.6'-trisulfonic acid.
45. 1-(3'-amino)-phenylazo-2-hydroxy-naphthalene-3.6.6'-trisulfonic acid.
46. 1-(3'-amino)-phenylazo-2-hydroxy-naphthalene-3.6.8.6'-tetrasulfonic acid.
47. 1-hydroxy-2-(3'-amino)-phenylazo-naphthalene-3.6'-disulfonic acid.
48. 1-hydroxy-2-(3'-amino)-phenylazo-naphthalene-4.6'-disulfonic acid.
49. 1-hydroxy-2-(3'-amino)-phenylazo-naphthalene-5.7.6'-trisulfonic acid.
50. 1-hydroxy-2(3'-amino)-phenylazo-naphthalene-3.8.6'-trisulfonic acid.
51. 1-hydroxy-2-(3'-amino)-phenylazo-8-chloronaphthalene-3.6.6'-trisulfonic acid.
52. 1-hydroxy-2-(3'-amino)-phenylazo-8-acetylamino-naphthalene-3.6.6'-trisulfonic acid.

53. 1-hydroxy-2-(3'-amino)-phenylazo-8-(4''-chloro)-benzoylamino-naphthalene-3.6.6'-trisulfonic acid.
54. 1-hydroxy-2-(3'-amino)-phenylazo-6-propionyl-amino-naphthalene-3.6'-disulfonic acid.
55. 1-hydroxy-2-(3'-amino)-phenylazo-7-propionyl-amino-naphthalene-3.6'-disulfonic acid.
56. 1-hydroxy-2-(3'-amino)-phenylazo-7-amino-naphthalene-3.6'-disulfonic acid.
57. 1-hydroxy-2-(3'-amino-4'-methyl)-phenylazo-naphthalene-4.6'-disulfonic acid.
58. 1-hydroxy-2-(3'-amino-4'-methyl)-phenylazo-naphthalene-3.6.6'-trisulfonic acid.
59. 1-(4'-amino)-phenylazo-2-hydroxy-naphthalene-8.2'-disulfonic acid.
60. 1-(4'-amino)-phenylazo-2-hydroxy-naphthalene-6.8.2'-trisulfonic acid.
61. 1-hydroxy-2-(4'-amino)-phenylazo-naphthalene-3.2'-disulfonic acid.
62. 1-hydroxy-2-(4'-amino)-phenylazo-8-acetylamino-naphthalene-3.5.2'-trisulfonic acid.
63. 1-hydroxy-2-(4'-amino)-phenylazo-8-(3''-chloro)-benzoyl-amino-naphthalene-3.5.2'-trisulfonic acid.
64. 1-[4'-(4''-amino)-phenyl]-phenylazo-2-hydroxy-naphthalene-6.8.2'-trisulfonic acid.
65. 1-hydroxy-2-[4'-(4''-amino)-phenyl]-phenylazo-naphthalene-3.6.2'-trisulfonic acid.
66. 1-hydroxy-2-[4'-(4''-amino)-phenyl]-phenylazo-8-chloronaphthalene-3.6.2'-trisulfonic acid.
67. 1-hydroxy-2-[4'-(4''-amino-2''-methyl)-phenyl-3'-methyl]-phenylazo-naphthalene-4.6'-disulfonic acid.
68. 1-hydroxy-2-[4'-(4''-amino-2''-methyl)-phenyl-3'-methyl]-phenylazo-naphthalene-3.6.6'-trisulfonic acid.
69. 1-hydroxy-2-[4'-(4''-amino-2''-methyl)-phenyl-3'-methyl]-phenylazo-naphthalene-3.8.6'-trisulfonic acid.
70. 1-[4'-(4''-amino-2''-methyl)-phenyl-3'-methyl]-phenylazo-2-amino-8-hydroxy-naphthalene-6.6'-disulfonic acid.
71. 1-[4'-(4''-amino-2''-methyl)-phenyl-3'-methyl]-phenylazo-2-amino-8-hydroxynaphthalene-3.6.6'-trisulfonic acid.
72. 1-(4'-amino)-naphthyl-(1')-azo-4-naphthyl-(1'')-azo-naphthalene-6((7).6'(7').5''-trisulfonic acid.
73. 4-(4''-amino)-phenylazo-4-(4''''-phenylazo)-phenyl-azo-stilbene-2.2'.4''''-trisulfonic acid.
74. 4-amino-4'-(1''.2''-naphthylene)-triazole-stilbene-2.2'4'''-trisulfonic acid.
75. 1-amino-2-(4'-amino)-phenylazo-7-phenylazo-8-hydroxy-naphthalene-3.6.4''-trisulfonic acid.
76. 4-amino-4'-(4''-methoxy)-naphthyl-(1'')-azostilbene-2.2'-disulfonic acid.
77. 1-(4'-amino)-benzoylamino-7-phenylazo-8-hydroxy-naphthalene-3.6.2''-trisulfonic acid.
78. Copper complex compound of 1-hydroxy-2-(2'-hydroxy-5'-methyl)-phenylazo-6-amino-naphthalene-3.4'-disulfonic acid.
79. Copper complex compound of 1-hydroxy-2-(2'-hydroxy)-naphthyl-(1')-azo-6-amino-naphthalene-3.4'-disulfonic acid.
80. Copper complex compound of 1-hydroxy-2-(1'-hydroxy)-naphthyl-(2')-azo-8-amino-naphthalene-3.6'.6'-tetrasulfonic acid.
81. Copper complex compound of 1-(2'-hydroxy-3'-amino)-phenylazo-2-hydroxy-naphthalene-6.5'-disulfonic acid.
82. Nickel complex compound of 1-hydroxy-2-(2'-hydroxy)-phenylazo-6-amino-naphthalene-3.3'.5'-trisulfonic acid.
83. 1:2-chromium complex compound of 1-hydroxy-2-(2'-hydroxy-3'-chloro)-phenylazo-6-amino-naphthalene-3,5'-disulfonic acid.
84. 1:2 chromium complex compound of 1-(2'-hydroxy)-phenylazo-2-hydroxy-8-amino-naphthalene-5'-sulfonic acid.
85. 1:2-cobalt complex compound of 1-phenyl-3-methyl-4-(2''-hydroxy-3''-amino)-phenylazo-5-pyrazolone-4'.5''-disulfonic acid.
86. Mixed 1:2-chromium complex compound of 1-(2'-hydroxy-3'-chloro)-phenylazo-2-hydroxy-8-acetyl-amino-naphthalene-5'-sulfonic acid and 1-hydroxy-2-(2'-hydroxy-3'-chloro)-phenylazo-6-amino-naphthalene-3.5'-disulfonic acid.
87. 1-amino-4-(3'-amino)-phenylamino-anthraquinone-2.7.4'-trisulfonic acid.
88. 1-amino-4-(3'-amino-6'-methyl)-phenylamino-anthraquinone-2.6.4'-trisulfonic acid.
89. 1-amino-4-(3'-amino-6'-methyl)-phenylamino-anthraquinone-2.7.4'-trisulfonic acid.
90. 1-amino-4-[4'-(4''-amino-2''-methyl)-phenyl-3'-methyl]-phenylamino-anthraquinone-2.8.5''-trisulfonic acid.
91. 1-amino-4-(4'-methylamino)-phenylamino-anthraquinone-2.6.2'-trisulfonic acid.
92. 1-amino-4-(3''-methylamino-4'-methyl)-phenyl-amino-anthraquinone-2.5.6'-trisulfonic acid.
93. Copperphthalocyanine-trisulfonic acid-sulfonic acid-(3'-amino)-phenylamide.
94. Copperphthalocyanine-trisulfonic acid amide-sulfonic acid-(3'-amino)-phenylamide.
95. Copperphthalocyanine-trisulfonic acid-sulfonic acid-(4'-amino-3'-sulfo)-phenylamide.
96. Copperphthalocyanine-disulfonic acid-dissulfonic acid-(4'-amino-3'-sulfo)-phenylamide.
97. Copperphthalocyanine-trisulfonic acid-sulfonic acid-(2'-amino)-ethylamide.
98. Mixed 1:2-chromium complex compound of 1-(2'-hydroxy-5'-chloro)-phenylazo-2-hydroxy-8-acetyl-amino-naphthalene-3'-sulfonic acid and 1-hydroxy-2-(2'-hydroxy-5'-chloro)-phenylazo-6-amino-naphthalene-3.3'-disulfonic acid.
99. 1:2-chromium complex compound of 1-hydroxy-2-(2'-hydroxy-5'-chloro)-phenylazo-6-amino-naphthalene-3.3'-disulfonic acid.
100. 1:2-cobalt complex compound of 1-hydroxy-2-(2'-hydroxy-5'-chloro)-phenylazo-6-amino-naphthalene-3.3'-disulfonic acid.
101. 1:2-chromium complex compound of 1-(2'-hydroxy-3'-chloro)-phenylazo-2-hydroxy-8-amino-naphthalene-5'-sulfonic acid.
102. 1:2-cobalt complex compound of 1-hydroxy-2-(2'-hydroxy-3'-chloro)-phenylazo-6-amino-naphthalene-3.5'-disulfonic acid.
103. 1:2-chromium complex compound of 1-(2'-hydroxy-5'-nitro)-phenylazo-2-hydroxy-8-amino-naphthalene-3'-sulfonic acid.
104. 1:2-chromium complex compound of 1-(2'-hydroxy-3'-nitro)-phenylazo-2-hydroxy-8-amino-naphthalene-5'-sulfonic acid.
105. 1:2-chromium complex compound of 1-hydroxy-2-(2'-hydroxy-5'-nitro)-phenylazo-6-amino-naphthalene-3.3'-disulfonic acid.
106. 1:2-cobalt complex compound of 1-hydroxy-2-(2'-hydroxy-5'-nitro)-phenylazo-6-amino-naphthalene-3.3'-disulfonic acid.
107. 1:2-chromium complex compound of 1-hydroxy-2-(2'-hydroxy-3'-nitro)-phenylazo-6-amino-naphthalene-3.5'-disulfonic acid.
108. 1:2-cobalt complex compound of 1-hydroxy-2-(2'-hydroxy-3'-nitro)-phenylazo-6-amino-naphthalene-3.5'-disulfonic acid.
109. 1:2-chromium complex compound of 1-(2'-hydroxy)-phenylazo-2-hydroxy-8-amino-naphthalene-3.5'-disulfonic acid.
110. 1:2-chromium complex compound of 1-hydroxy-2-(2'-hydroxy-6'-nitro)-naphthyl-(1')-azo-6-amino-naphthalene-3.4'-disulfonic acid.
111. 1:2-cobalt complex compound of 1-hydroxy-2-(2'-hydroxy-6'-nitro)-naphthyl-(1')-azo-6-amino-naphthalene-3.4'-disulfonic acid.
112. Mixed 1:2-chromium complex compound of 1-(2'-hydroxy-3'-nitro)-phenylazo-2-hydroxy-8-amino-naphthalene-5'-sulfonic acid and 1-hydroxy- 112. 2 - (2' - hydroxy - 3' - chloro) - phenylazo - 6 - <u>amino</u>-naphthalene-3.5'-disulfonic acid.
113. 1:2 - chromium complex compound of 1 - hydroxy-2 - (2' - hydroxy) - naphthyl - (1') - azo - 6 - <u>amino</u>-naphthalene-3.4'-disulfonic acid.
114. 1:2 - chromium complex compound of 1 - hydroxy-2 - (2' - hydroxy) - phenylazo - 6 - <u>amino</u> - naphthalene 3-sulfonic acid-5'-sulfonic acid amide.
115. 1 - hydroxy - 2 - (3' - <u>amino</u>) - phenylazo - naphthalene-4.6.6'-trisulfonic acid.
116. 1 - hydroxy - 2 - (3' - <u>amino</u>) - phenylazo-naphthalene-4.7.6'-trisulfonic acid.
117. 1 - hydroxy - 2 - (3' - <u>amino</u>) - phenylazo - naphthalene-3.5.7.6'-tetrasulfonic acid.
118. 1 - hydroxy - 2 - (3' - <u>amino</u>) - phenylazo - naphthalene-3.6.6'-trisulfonic acid-8-sulfonic acid amide.
119. Copper complex compound of 1-hydroxy-2-(2'-hydroxy) - phenylazo - 8 - <u>amino</u> - naphthalene - 3.6.5'-trisulfonic acid.
120. Nickel complex compound of 1-hydroxy-2-(2'-hydroxy) - phenylazo - 8 - <u>amino</u> - naphthalene - 3.6.5'-trisulfonic acid.
121. Copper complex compound of 1-hydroxy-2-(2'-hydroxy - 5' - chloro) - phenylazo - 8 - <u>amino</u> - naphthalene-3.6.3'-trisulfonic acid.
122. Copper complex compound of 1-hydroxy-2-(2'-hydroxy - 3' - chloro) - phenylazo - 8 - <u>amino</u> - naphthalene-3.6.5'-trisulfonic acid.
123. Copper complex compound of 1 - hydroxy-2-(2'-hydroxy - 5' - methylsulfonyl) - phenylazo - 8 - <u>amino</u>-naphthalene-3.6-disulfonic acid.
124. Copper complex compound of 1-hydroxy-2-(2'-hydroxy) - phenylazo - 8 -<u>amino</u> - naphthalene - 3.6 - disulfonic acid-5'-sulfonic acid amide.
125. Copper complex compound of 1-hydroxy-2-(2'-hydroxy) - phenylazo - 8 - <u>amino</u> - naphthalene - 3.5.5'-trisulfonic acid.
126. Copper complex compound of 1-hydroxy-2-(2'-hydroxy - 5' - methylsulfonyl) - phenylazo - 8 - <u>amino</u>-naphthalene-3.5-disulfonic acid.
127. Copper complex compound of 1 - hydroxy - 2 - (2'-hydroxy) - phenylazo - 8 - <u>amino</u> - naphthalene - 3.6.3'.5'-tetrasulfonic acid.
128. Copper complex compound of 1-hydroxy-(2'-hydroxy - 3' - carboxy) - phenylazo - 8 - <u>amino</u> - naphthalene-3.6.5'-trisulfonic acid.
129. Copper complex compound of 1-hydroxy-2-(2'-hydroxy) - phenylazo - 8 -<u>amino</u> - naphthalene - 3.5.3'.5'-tetrasulfonic acid.
130. Copper complex compound of 1-hydroxy-2-(2'-hydroxy - 3' - carboxy) - phenylazo - 8 - <u>amino</u> - naphthalene-3.5.5'-trisulfonic acid.
131. 1 - amino - 4 - (3' - <u>amino</u>) - phenylamino - anthraquinone-2.6.4'-trisulfonic acid.
132. 1 - amino - 4 - (3' - <u>amino</u>) - phenylamino - anthraquinone-2.4'-disulfonic acid.
133. 1 - acetylamino - 7 - (3' - <u>hydroxy</u>) - phenylazo - 8-hydroxy-naphthalene-3.6-disulfonic acid.
134. 1 - (4' - <u>hydroxy</u>) - phenylazo - 2 - hydroxynaphthalene-3.6-disulfonic acid.
135. 1 - (2'.5' - dichloro) - phenyl - 3 - methyl - 4 -(3''-<u>amino</u>)-phenylazo-5-pyrozolone-4'.6''-disulfonic acid.
136. 1 - <u>amino</u> - 7 - phenylazo - 8 - hydroxynaphthalene-3.6.2''-trisulfonic acid.
137. 1 - benzoyl - 2 - hydroxy - 6 - (4' - <u>methylamino</u>)-phenylamino-2-azabenzanthrone-4.2'-disulfonic acid.
138. 1 - acetyl - 2 - hydroxy - 6 - (4' - <u>amino</u>) - phenylamino-3-azabenzanthrone-4.2'-disulfonic acid.
139. 1 - carbethoxy - 2 - methyl - 6 - (4' - <u>amino</u>) - phenylamino-3-azabenzanthrone-4.2'-disulfonic acid.
140. 1 - amino - 2 - (4' - isoamyl) - phenoxy - 4 - (4''-<u>amino</u>)-phenylamino-anthraquinone - 2'.2'' - disulfonic acid.

The dyeings on cotton obtained with the reactive dyestuffs derived from the dyestuffs No. 9 to 140 have the following shades.

| Dyestuff No.: | Shade |
|---|---|
| 9 | Greenish yellow. |
| 10 | Do. |
| 11 | Red. |
| 12 | Yellowish red. |
| 13 | Blue. |
| 14 | Reddish yellow. |
| 15 | Bluish red. |
| 16 | Reddish orange. |
| 17 | Blue. |
| 18 | Turquoise blue. |
| 19 | Bluish red. |
| 20 | Do. |
| 21 | Do. |
| 22 | Bluish red. |
| 23 | Do. |
| 24 | Ruby. |
| 25 | Red. |
| 26 | Violet. |
| 27 | Yellow. |
| 28 | Reddish yellow. |
| 29 | Do. |
| 30 | Do. |
| 31 | Reddish yellow. |
| 32 | Greenish yellow. |
| 33 | Yellow. |
| 34 | Yellowish orange. |
| 35 | Greenish yellow. |
| 36 | Reddish yellow. |
| 37 | Golden. |
| 38 | Greenish yellow. |
| 39 | Do. |
| 40 | Yellow. |
| 41 | Reddish yellow. |
| 42 | Orange. |
| 43 | Do. |
| 44 | Do. |
| 45 | Do. |
| 46 | Orange red. |
| 47 | Orange. |
| 48 | Orange red. |
| 49 | Yellowish red. |
| 50 | Red. |
| 51 | Scarlet. |
| 52 | Bluish red. |
| 53 | Do. |
| 54 | Orange. |
| 55 | Yellowish red. |
| 56 | Do. |
| 57 | Scarlet. |
| 58 | Red. |
| 59 | Do. |
| 60 | Do. |
| 61 | Red. |
| 62 | Bordeaux. |
| 63 | Do. |
| 64 | Red. |
| 65 | Bluish red. |
| 66 | Do. |
| 67 | Scarlet. |
| 68 | Red. |
| 69 | Do. |
| 70 | Do |
| 71 | Do |
| 72 | Red-brown. |
| 73 | Brownish orange. |
| 74 | Greenish yellow. |
| 75 | Dark green. |
| 76 | Reddish yellow. |

| Dyestuff No.: | Shade |
|---|---|
| 77 | Red. |
| 78 | Violet-red. |
| 79 | Violet-blue. |
| 80 | Violet. |
| 81 | Blue-red. |
| 82 | Red-brown. |
| 83 | Reddish navy-blue. |
| 84 | Gray. |
| 85 | Olive-green. |
| 86 | Reddish navy-blue. |
| 87 | Reddish blue. |
| 88 | Do. |
| 89 | Reddish blue. |
| 90 | Blue. |
| 91 | Do. |
| 92 | Reddish blue. |
| 93 | Turquoise blue. |
| 94 | Do. |
| 95 | Do. |
| 96 | Do. |
| 97 | Do. |
| 98 | Reddish navy-blue. |
| 99 | Navy-blue. |
| 100 | Brownish violet. |
| 101 | Gray. |
| 102 | Brownish violet. |
| 103 | Greenish gray. |
| 104 | Gray. |
| 105 | Reddish navy-blue. |
| 106 | Brown. |
| 107 | Reddish navy-blue. |
| 108 | Brownish violet. |
| 109 | Gray. |
| 110 | Navy-blue. |
| 111 | Brownish violet. |
| 112 | Reddish navy-blue. |
| 113 | Navy-blue. |
| 114 | Reddish navy-blue. |
| 115 | Yellowish red. |
| 116 | Do. |
| 117 | Red-orange. |
| 118 | Red. |
| 119 | Violet. |
| 120 | Reddish violet. |
| 121 | Bluish violet. |
| 122 | Violet. |
| 123 | Reddish violet. |
| 124 | Violet. |
| 125 | Reddish violet. |
| 126 | Do. |
| 127 | Violet. |
| 128 | Do. |
| 129 | Reddish violet. |
| 130 | Do. |
| 131 | Blue. |
| 132 | Reddish blue. |
| 133 | Bluish red. |
| 134 | Red. |
| 135 | Greenish yellow. |
| 136 | Red. |
| 137 | Violet-red. |
| 138 | Do. |
| 139 | Orange-red. |
| 140 | Blue-violet. |

Formulae of representative dyestuffs of the foregoing examples are as follows:

*Example 1*

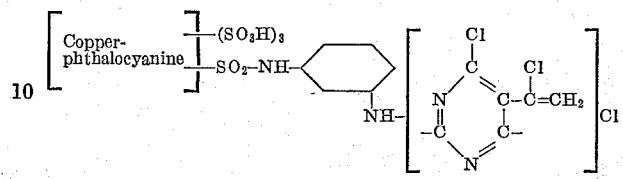

*Example 2*

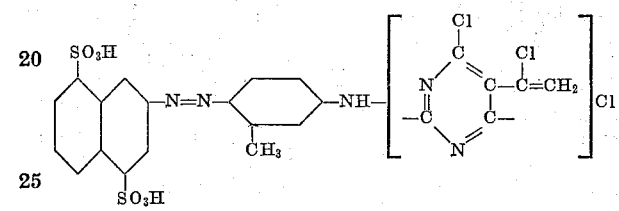

*Example 3*

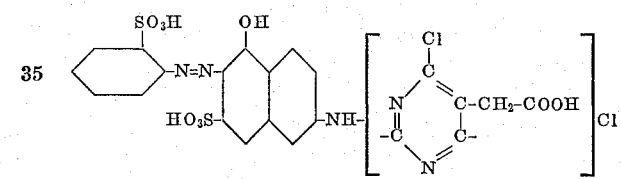

*Example 4*

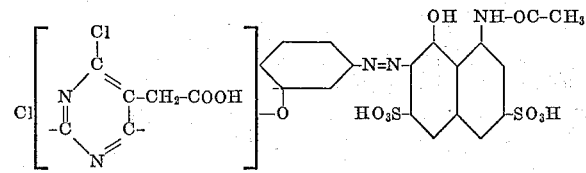

*Example 5*

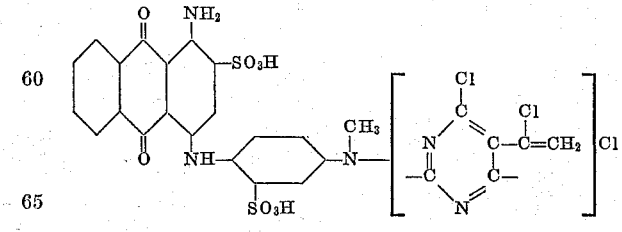

*Example 6*

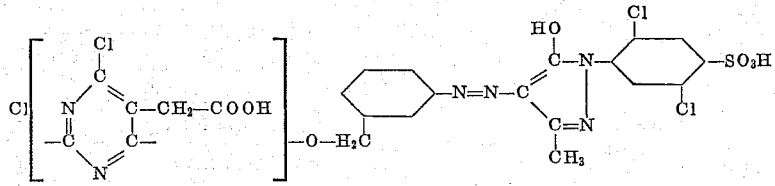

*Example 7*

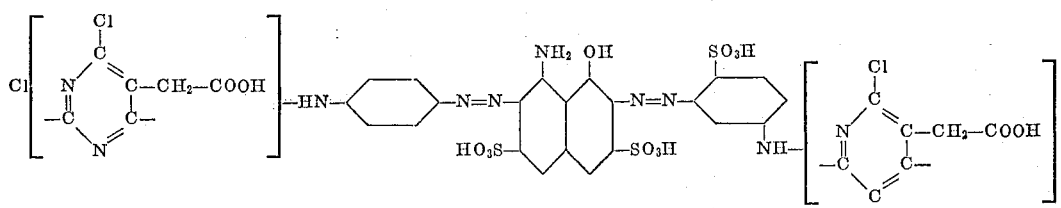

*Example 8*

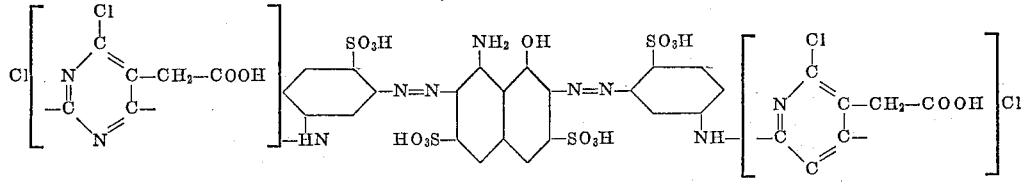

Having thus disclosed the invention what we claim is:

1. A dyestuff selected from the group consisting of water-soluble azo, anthraquinone and phthalocyanine dyestuffs containing one to two dihalogenopyrimidyl radicals bearing in the 5-position a substituent selected from the group consisting of carboxymethyl, α-chlorovinyl and α-bromovinyl, the said dihalogenopyrimidyl radicals being connected to the remainder of the dyestuff molecule by a bridge selected from the group consisting of —O—, —NH— and —N(CH₃)—, both halogens of the dihalogenopyrimidyl radicals having the same atomic number from 17 to 35 inclusive.

2. A compound according to claim 1, wherein the azo dyestuff is a water-soluble monoazo dyestuff.

3. A compound according to claim 1, wherein the azo dyestuff is a metal complex compound selected from the group consisting of the 1:2-chromium, 1:2-cobalt, 1:1-nickel and 1:1-copper complex compounds of an azo dyestuff.

4. A compound according to claim 1, wherein the azo dyestuff is a water-soluble disazo dyestuff.

5. A compound according to claim 1, wherein the dyestuff is a water-soluble anthraquinone dyestuff.

6. A compound according to claim 1, wherein the dyestuff is a water-soluble phthalocyanine dyestuff.

7. The water-soluble organic dyestuff of the formula

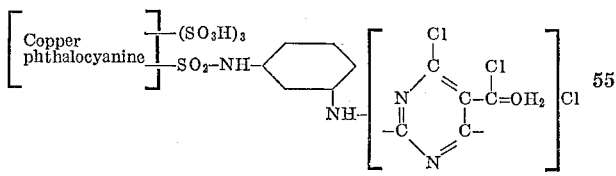

8. The water-soluble organic dyestuff of the formula

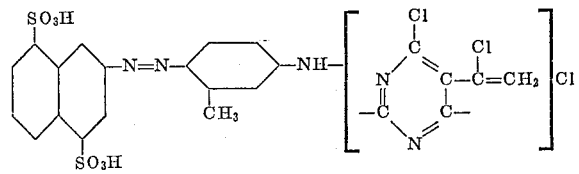

9. The water-soluble organic dyestuff of the formula

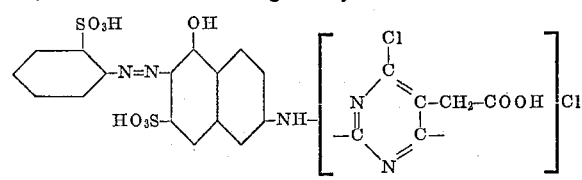

10. The water-soluble organic dyestuff of the formula

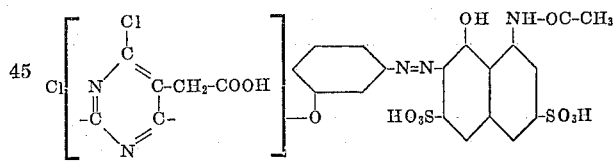

11. The water-soluble organic dyestuff of the formula

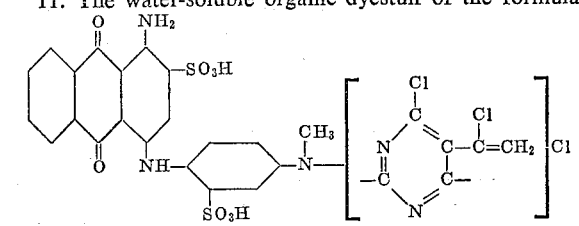

12. The water-soluble organic dyestuff of the formula

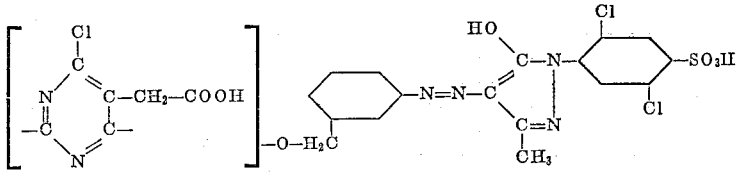

References Cited by the Examiner
UNITED STATES PATENTS

| | | | |
|---|---|---|---|
| 223,019 | 12/79 | Vaughan | 8—1 |
| 2,232,892 | 2/41 | Klenck | 8—1 |
| 2,665,273 | 1/54 | Mast et la. | 260—154 |
| 2,935,506 | 5/60 | Heslop et al. | 260—154 |
| 2,980,665 | 4/61 | Langley | 260—154 |

FOREIGN PATENTS 822,948  11/59  Great Britain.

CHARLES B. PARKER, *Primary Examiner.*
LEON ZITVER, *Examiner.*